(12) United States Patent
Ni

(10) Patent No.: US 9,253,706 B2
(45) Date of Patent: Feb. 2, 2016

(54) METHOD, APPARATUS, AND SYSTEM FOR LOCAL ROUTING AUTHORIZATION

(71) Applicant: HUAWEI TECHNOLOGIES CO., LTD., Shenzhen (CN)

(72) Inventor: Hui Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 543 days.

(21) Appl. No.: 13/682,090

(22) Filed: Nov. 20, 2012

(65) Prior Publication Data

US 2013/0077614 A1    Mar. 28, 2013

Related U.S. Application Data

(63) Continuation of application No. PCT/CN2010/073231, filed on May 25, 2010.

(51) Int. Cl.
*H04W 40/02* (2009.01)
*H04L 12/14* (2006.01)
*H04W 12/08* (2009.01)
*H04L 12/725* (2013.01)

(52) U.S. Cl.
CPC .............. *H04W 40/02* (2013.01); *H04L 12/14* (2013.01); *H04W 12/08* (2013.01); *H04L 45/30* (2013.01)

(58) Field of Classification Search
CPC ...... H04W 40/02; H04W 12/08; H04L 12/14; H04L 45/30; H04L 12/02
USPC .................................................. 370/338, 230
See application file for complete search history.

(56) References Cited

U.S. PATENT DOCUMENTS

| 7,260,060 B1* | 8/2007 | Abaye et al. .................. 370/230 |
| 2005/0078824 A1 | 4/2005 | Malinen et al. |
| 2010/0020779 A1* | 1/2010 | Kalhan et al. ................. 370/338 |

FOREIGN PATENT DOCUMENTS

| CN | 101309505 | 11/2008 |
| CN | 101345679 | 1/2009 |
| CN | 101431783 | 5/2009 |
| CN | 101584158 | 11/2009 |
| WO | 2005/036852 | 4/2005 |

OTHER PUBLICATIONS

Office Action, dated May 10, 2013, in corresponding Chinese App. No. 201080001612.2.
(Continued)

*Primary Examiner* — Kwang B Yao
*Assistant Examiner* — Syed M Bokhari
(74) *Attorney, Agent, or Firm* — Staas & Halsey LLP

(57) ABSTRACT

A method includes: respectively initiating a local routing authorization request to a first local routing policy entity and a second local routing policy entity according to service flow information of a first mobile station, so as to enable the first local routing policy entity to perform local routing authorization for the first mobile station and enable the second local routing policy entity to perform local routing authorization for the second mobile station; and when a local routing authorization result of the first mobile station and a local routing authorization result of the second mobile station are both success, transmitting, through local routing, a service flow corresponding to the service flow information of the first mobile station and a service flow corresponding to the service flow information of the second mobile station.

19 Claims, 7 Drawing Sheets

(56) References Cited

OTHER PUBLICATIONS

*Part 16: Air Interface for Broadband Wireless Access Systems*, IEEE Std 802.16-2009, pp. 79-95.
*WiMAX ASN Local Routing of the Bearer Traffic (Phase 1)*, WiMAX Form Network Working Group, WiMAX Forum Network Architecture Release 1.6-SON, pp. 1-15.

International Search Report, dated Mar. 10, 2011, in corresponding International Application No. PCT/CN2010/073231 (3 pp.).
Written Opinion of the International Searching Authority, dated Mar. 10, 2011, in corresponding International Application No. PCT/CN2010/073231 (5 pp.).
International Search Report of PCT/CN2010/073231 mailed Mar. 10, 2011.

* cited by examiner

METHOD, APPARATUS, AND SYSTEM FOR LOCAL ROUTING AUTHORIZATION

CROSS-REFERENCE TO RELATED APPLICATIONS

This application is a continuation of International Application No. PCT/CN2010/073231, filed on May 25, 2010, titled "METHOD, APPARATUS, AND SYSTEM FOR A LOCAL ROUTING AUTHORIZATION", which is hereby incorporated by reference in its entirety.

FIELD

The present disclosure relates to the field of communications technologies, and in particular, to a method, apparatus and system for local routing authorization.

BACKGROUND

With the development of communication technologies, mobile communication networks are also more and more advanced. The mobile WiMAX (Worldwide Interoperability for Microwave Access, worldwide interoperability for microwave access network) based on the IEEE (Institute of Electrical and Electronic Engineers, Institute of Electrical and Electronic Engineers) 802.16 wireless access technology attracts wide attention because it can provide high-speed data transmission capabilities.

In a mobile WiMAX network, when an Mobile Station (MS) transmits a service flow with an external network, the uplink service flow sent by the MS is generally transmitted to a Serving Access Service Network Gateway (Serving ASN-GW) through a Base Station (BS), and then transmitted by the Serving ASN-GW to an Anchor ASN-GW, and finally transmitted to the external network through an Home Agent (HA); and the downlink service flow sent by the external network is routed to the MS through a bearer path reverse to the uplink service flow direction. As shown in FIG. 1, when the above method is implemented to transmit a service flow between two MSs (MS1 and MS2), if the MS1 and MS2 are managed by a same Serving ASN-GW, and the path for transmitting the service flow between the MS1 and the MS2 is indicated by the dotted line shown in FIG. 1. As seen from FIG. 1, the transmission path of the service flow from the Serving ASN-GW to the HA is overlapped, thus causing redundancy of the transmission path and an unnecessary transmission delay of the service flow and transmission load of the core network. Therefore, it is proposed that the service flow between the MS1 and the MS2 is transmitted by performing Local Routing (LR). Specifically, as shown by the solid line in FIG. 1, the Serving ASN-GW directly transmits the service flow from the MS1 to the MS2, or directly transmits the service flow from the MS2 to the MS1.

In general, the network side authorizes the service flow of the MS according to the Quality of Service (QoS) subscription information of the MS or the policy of the operator. However, the local routing involves two MSs, the existing network side may not satisfy the requirement for authorizing local routing.

SUMMARY

Embodiments of the present invention provide a method, apparatus, and system for local routing authorization.

An embodiment of the present invention provides a method for local routing authorization, which includes:

initiating a local routing authorization request to a first local routing policy entity and a second local routing policy entity respectively, according to service flow information of a first mobile station or according to service flow information of the first mobile station and a second mobile station, so as to enable the first local routing policy entity to perform local routing authorization for the first mobile station and enable the second local routing policy entity to perform local routing authorization for the second mobile station; and when a local routing authorization result of the first mobile station and a local routing authorization result of the second mobile station are both success, transmitting, by performing local routing, a service flow corresponding to the service flow information of the first mobile station and a service flow corresponding to the service flow information of the second mobile station.

Another embodiment of the present invention provides an apparatus for local routing authorization, which includes:

a local routing authorizing module, configured to initiate a local routing authorization request to a first local routing policy entity and a second local routing policy entity respectively, according to service flow information of a first mobile station or according to service flow information of the first mobile station and a second mobile station, so as to enable the first local routing policy entity to perform local routing authorization for the first mobile station and enable the second local routing policy entity to perform local routing authorization for the second mobile station; and a local routing transmitting module, configured to transmit, by performing local routing, a service flow corresponding to the service flow information of the first mobile station and a service flow corresponding to the service flow information of the second mobile station, when a local routing authorization result of the first mobile station and a local routing authorization result of the second mobile station are both success.

A further embodiment of the present invention provides a system for local routing authorization, which includes:

a local routing executing entity, a first local routing policy entity, and a second local routing policy entity, wherein:

the local routing executing entity is configured to initiate a local routing authorization request to the first local routing policy entity and the second local routing policy entity respectively, according to service flow information of a first mobile station or according to service flow information of the first mobile station and a second mobile station; and when a local routing authorization result of the first mobile station and a local routing authorization result of the second mobile station are both success, transmit, by performing local routing, a service flow corresponding to the service flow information of the first mobile station and a service flow corresponding to the service flow information of the second mobile station;

the first local routing policy entity is configured to perform local routing authorization for the first mobile station after receiving the local routing authorization request initiated by the local routing executing entity; and the second local routing policy entity is configured to perform local routing authorization for the second mobile station after receiving the local routing authorization request initiated by the local routing executing entity.

Based on the above, local routing authorization is performed for the first mobile station and the second mobile station according to the service flow information of the first terminal or according to the service flow information of the first mobile station and the second mobile station, which implements authorization for local routing and may satisfy the requirement for authorizing local routing.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EMBODIMENTS

In order to make the objectives, technical solutions and advantages of the present invention clearer, the present invention is hereinafter described in detail with reference to the accompanying drawings and embodiments. The exemplary embodiments and descriptions of the embodiments of the present invention are used to illustrate the present invention, but the present invention is not limited thereto.

A service flow between the MS1 and the MS2 is transmitted by performing LR. The LR means that when the LR executing entities of the MS1 and MS2 are the same physical entity, the entity directly transmits the service flow from the MS1 to the MS2, or directly transmits the service flow from the MS2 to the MS1. An LR executing entity is a network entity that may execute local forwarding of service flows, for example, the Serving ASN-GW, BS, and Anchor ASN-GW in the WiMAX network, and a Serving General Packet Radio Service Support Node (SGSN), and a Serving Gateway (Serving GW) in a 3rd Generation Partnership Project (3GPP) network. Accordingly, if the LR executing entity is a base stations the LR executing entities of the MS1 and the MS2 being the same physical entity means that the MS1 and the MS2 are attached to the same base station. If the LR executing entity is a gateway, the LR executing entities of the MS1 and the MS2 being the same physical entity means that the MS1 and the MS2 are served by the same gateway.

Embodiment 1

Figure 1:
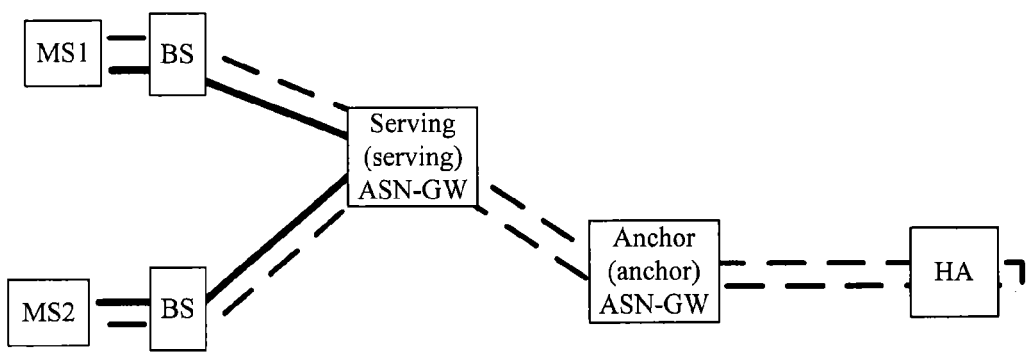
FIG. 1 is a schematic diagram of a path for transmitting a service flow and a schematic diagram of a path of local routing for transmitting a service flow according to the prior art.
Figure 2A:
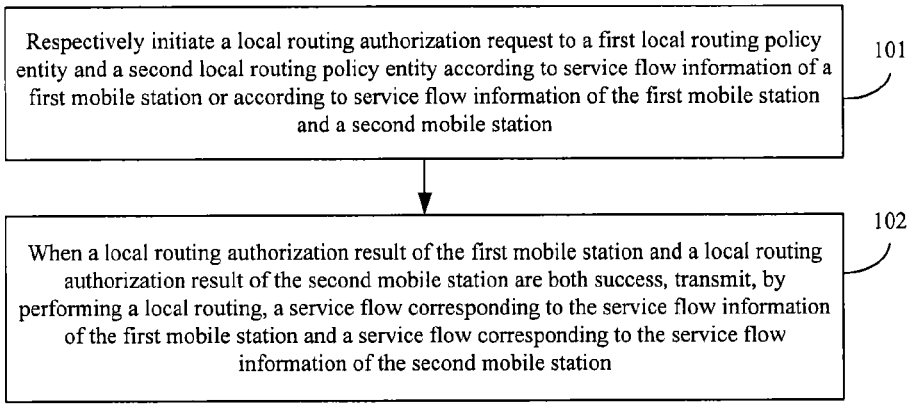
FIG. 2a is a flowchart of a method for local routing authorization according to Embodiment 1 of the present invention.

As shown in FIG. 2a, the embodiment of the present invention provides a method for local routing authorization, which is performed by an LR executing entity, and includes the following:

101: initiating a local routing authorization request to a first local routing policy entity and a second local routing policy entity respectively, according to service flow information of a first mobile station or according to service flow information of the first mobile station and a second mobile station, so as to enable the first local routing policy entity to perform local routing authorization for the first mobile station and enable the second local routing policy entity to perform local routing authorization for the second mobile station.

102: When a local routing authorization result of the first mobile station and a local routing authorization result of the second mobile station are both success, transmitting, by performing local routing, a service flow corresponding to the service flow information of the first mobile station and a service flow corresponding to the service flow information of the second mobile station.

Further, the step of initiating a local routing authorization request to the first local routing policy entity and the second local routing policy entity respectively, according to service flow information of the first mobile station, so as to enable the first local routing policy entity to perform local routing authorization for the first mobile station and enable the second local routing policy entity to perform local routing authorization for the second mobile station, includes:

obtaining the service flow information of the first mobile station;

initiating, according to the service flow information of the first mobile station, a request for performing local routing authorization for the first mobile station to the first local routing policy entity to which the first mobile station belongs, so as to enable the first local routing policy entity to perform the local routing authorization for the first mobile station; and when the local routing authorization result of the first mobile station is success, initiating a request for performing local routing authorization for the second mobile station to the second local routing policy entity to which the second mobile station belongs, so as to enable the second local routing policy entity to perform the local routing authorization for the second mobile station.

Further, after the second local routing policy entity to perform local routing authorization for the second mobile station, the method includes:

when the local routing authorization result of the second mobile station is success, establishing a data bearer between the LR executing entity and the second mobile station.

Further, initiating a local routing authorization request to the first local routing policy entity and the second local routing policy entity respectively, according to service flow information of the first mobile station and the second mobile station, so as to enable the first local routing policy entity to perform a local routing authorization for the first mobile station and enable the second local routing policy entity to perform local routing authorization for the second mobile station, includes:

obtaining the service flow information of the first mobile station; and initiating, according to the service flow information of the first mobile station, a request for performing local routing authorization for the first mobile station to the first local routing policy entity to which the first mobile station belongs, so as to enable the first local routing policy entity to perform local routing authorization for the first mobile station; and obtaining the service flow information of the second mobile station; and initiating, according to the service flow information of the second mobile station, a request for performing local routing authorization for the second mobile station to the second local routing policy entity to which the second mobile station belong, so as to enable the second local routing policy entity to perform local routing authorization for the second mobile station.

Further, initiating a local routing authorization request to the first local routing policy entity and the second local routing policy entity respectively, according to service flow information of the first mobile station and the second mobile station, so as to enable the first local routing policy entity to perform local routing authorization for the first mobile station and enable the second local routing policy entity to perform local routing authorization for the second mobile station, includes:

obtaining the service flow information of the first mobile station; and initiating, according to the service flow information of the first mobile station, a request for performing local routing authorization for the first mobile station to the first local routing policy entity to which the first mobile station belongs, so as to enable the first local routing policy entity to perform the local routing authorization for the first mobile station; and obtaining the service flow information of the second mobile station; and initiating, according to the service flow information of the second mobile station and the local routing authorization result of the first mobile station, a request for performing local routing authorization for the second mobile station to the second local routing policy entity to which the second mobile station belongs, so as to enable the second local routing policy entity to perform the local routing authorization for the second mobile station.

Further, the step of initiating, according to the service flow information of the first mobile station, a request for performing local routing authorization for the first mobile station to the first local routing policy entity to which the first mobile station belongs, includes:

determining, according to the correspondent node information included in the service flow information of the first mobile station, whether local routing can be executed for the service flow corresponding to the service flow information of the first mobile station; and if local routing can be executed for the service flow corresponding to the service flow information of the first mobile station, initiating a request for performing local routing authorization for the first mobile station to the first local routing policy entity to which the first mobile station belongs.

Further, the step of initiating, according to the service flow information of the second mobile station, a request for performing local routing authorization for the second mobile station to the second local routing policy entity to which the second mobile station belongs, includes:

according to the correspondent node information included in the service flow information of the second mobile station, determining whether local routing can be executed for the service flow corresponding to the service flow information of the second mobile station; and if local routing can be executed for the service flow corresponding to the service flow information of the second mobile station, initiating a request for performing local routing authorization for the second mobile station to the second local routing policy entity to which the second mobile station belongs.

Further, the step of initiating, according to the service flow information of the second mobile station and the local routing authorization result of the first mobile station, a request for performing local routing authorization for the second mobile station to the second local routing policy entity to which the second mobile station belongs, includes:

according to the correspondent node information included in the service flow information of the second mobile station, determining whether local routing can be executed for the service flow corresponding to the service flow information of the second mobile station;

if local routing can be executed for the service flow corresponding to the service flow information of the second mobile station, determining whether the local routing authorization result of the first mobile station is success; and if the local routing authorization result of the first mobile station is success, initiating a request for performing local routing authorization for the second mobile station to the second local routing policy entity to which the second mobile station belongs.

Figure 2B:
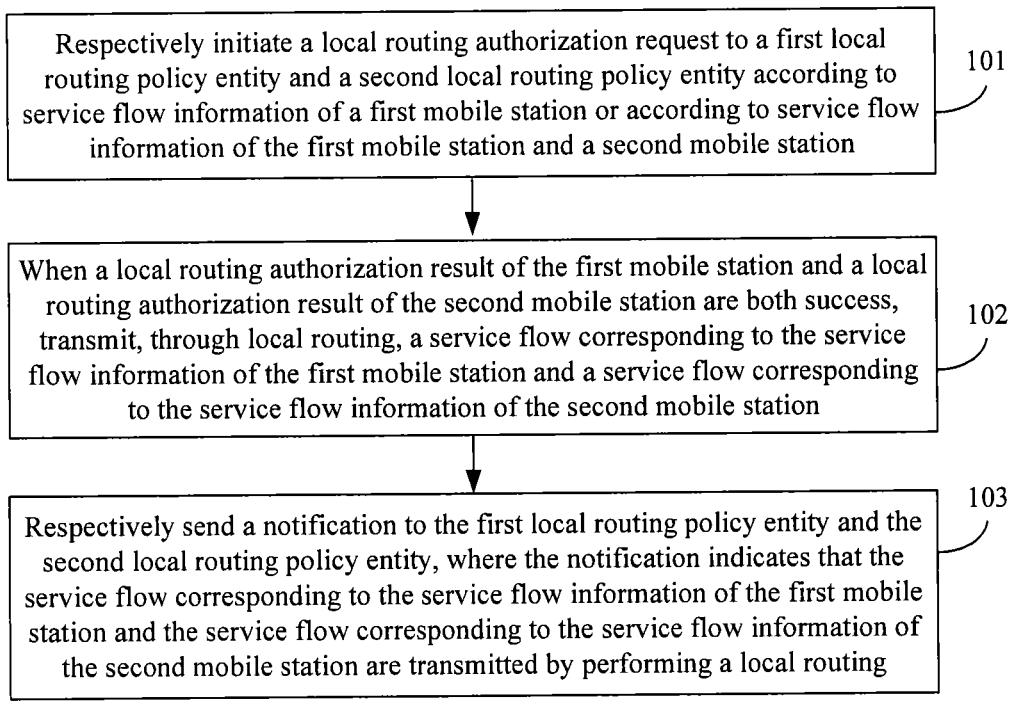
FIG. 2b is a flowchart of another method for local routing authorization according to Embodiment 1 of the present invention.

Further, as shown in FIG. 2b, after transmitting, by performing the local routing, the service flow corresponding to the service flow information of the first mobile station and the service flow corresponding to the service flow information of the second mobile station, the method further includes:

103: respectively sending a notification message to the first local routing policy entity and the second local routing policy entity, where the notification message indicates that the service flow corresponding to the service flow information of the first mobile station and the service flow corresponding to the service flow information of the second mobile station are transmitted by performing local routing.

It should be noted that the above first local routing policy entity and second local routing policy entity may be two independent entities or may also be integrated into an independent entity, which is not limited herein.

In the method for local routing authorization according to the embodiment of the present invention, local routing authorization is performed for the first mobile station and the second mobile station according to the service flow information of the first terminal or according to the service flow information of the first mobile station and the second mobile station, so that an authorization for local routing is implemented and thus the requirement for authorizing local routing is satisfied. Furthermore, the local routing authorization may be first performed for the first mobile station; after the local routing authorization for the first mobile station is successful, the local routing authorization is performed for the second mobile station, in such a way that network information resources is saved. Alternatively, the local routing authorization may be performed for the first mobile station and the second mobile station concurrently, so as to save the time of the local routing authorization.

Embodiment 2

Figure 3:
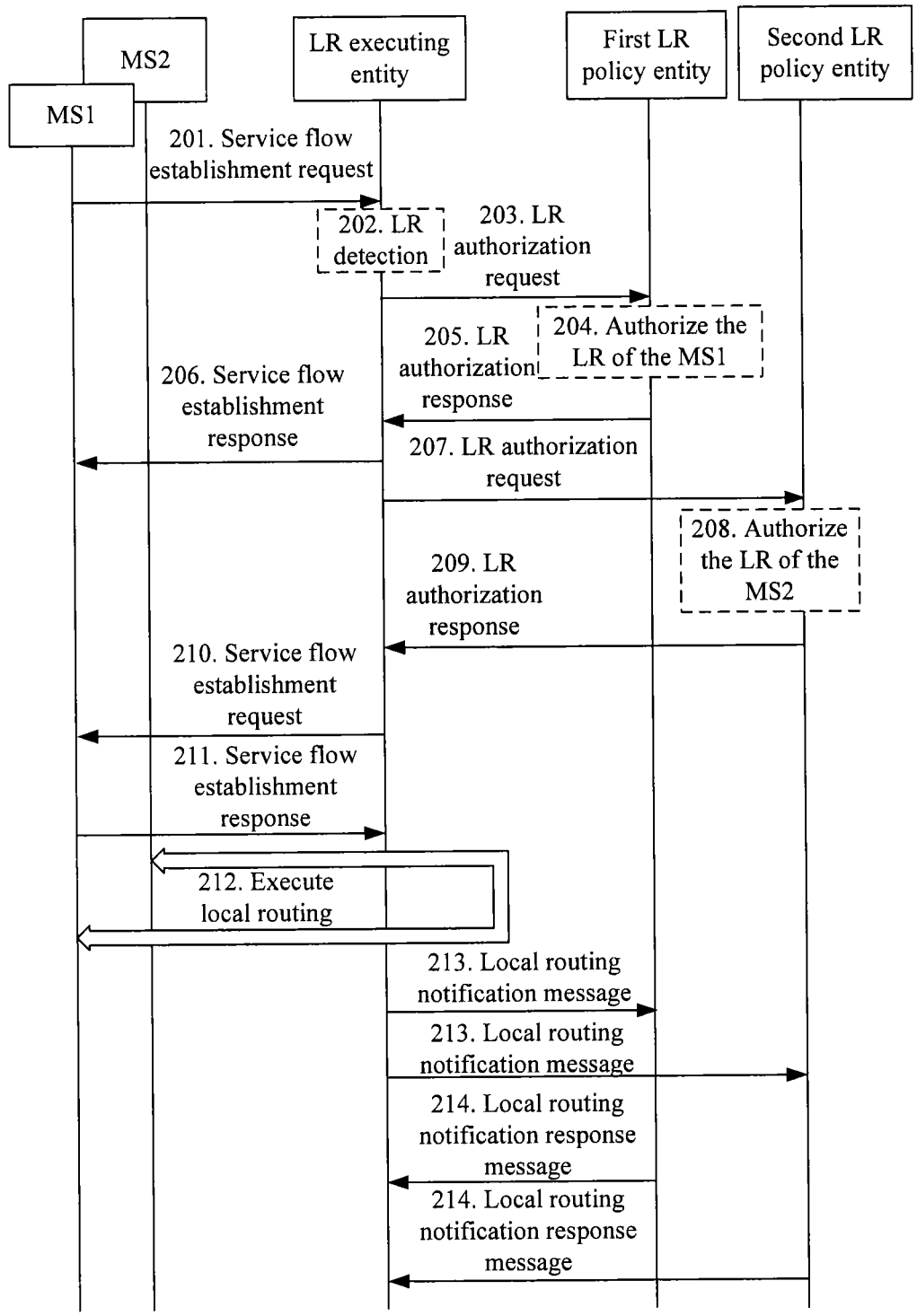
FIG. 3 is a flowchart of a method for local routing authorization according to Embodiment 2 of the present invention.

As shown in FIG. 3, the embodiment of the present invention provides a method for local routing authorization. After the LR executing entity detects a service flow that can be transmitted by performing local routing, the LR executing entity first performs local routing authorization for the MS1; after the local routing authorization for the MS1 is successful, the LR executing entity initiates local routing authorization for the MS2 (i.e., correspondent node of the MS1); after the local routing authorization for the MS2 is successful, the LR executing entity initiates establishment of a data bearer of the MS2, and transmits the service flow between the MS1 and the MS2 by performing local routing. The method includes the following steps:

201: The MS1 sends a service flow establishment request carrying the service flow information of the MS1 to the LR executing entity for requesting to establish a data bearer for transmitting a service flow.

The LR executing entity is a network entity that may execute a local forwarding of service flows in the network, for example, the Serving ASN-GW, BS, and Anchor ASN-GW etc. in the WiMAX network; and the SGSN and Serving GW etc. in the 3GPP network. The service flow information indicates the information that needs to be created through application-layer negotiation between the MS1 and the MS2 for executing the communication service between the MS1 and the MS2. The service flow information may be, for example, an Internet Protocol (IP) quintuple (source IP address, destination IP address, source port number, destination port number, protocol type) corresponding to the service flow.

202: The LR executing entity determines, according to the correspondent node information included in the service flow information of the MS1, whether local routing can be executed for the service flow corresponding to the service flow information of the MS1, and if so, executes step 203; otherwise, the LR executing entity performs processing according to the method for transmitting service flows in the prior art.

The correspondent node information included in the service flow information of the MS1 includes an IP address and a protocol type of the correspondent node of MS1. Specifically, according to the correspondent node information included in the service flow information of MS1, if it is determined that the correspondent node of MS1 is MS2, and the LR executing entities of the MS1 and MS2 are the same physical entity, then it can be concluded that local routing can be executed for the service flow corresponding to the service flow information of the MS1; otherwise, the local routing cannot be executed for the service flow corresponding to the service flow information of the MS1.

203: The LR executing entity sends an LR authorization request to the first LR policy entity to which the MS1 belongs, requesting the first LR policy entity to perform local routing authorization for the MS1.

The first LR policy entity may be a network entity responsible for performing authorization or providing policies for the local routing of the MS1, for example, an anchor authenticator, a service flow authorizing unit, and a Policy and Charging Rules Function (PCRF) etc.

204: The first LR policy entity determines, according to the subscription information of the MS1 and/or a policy of the operator that the MS1 belongs to etc., whether to allow to execute local routing on the service flow corresponding to the service flow information of the MS1; if the first LR policy entity determines to allow to execute local routing on the service flow corresponding to the service flow information of the MS1, the first LR policy entity executes step 205; otherwise, the first LR policy entity performs processing according to the method for transmitting service flows in the prior art.

205: The first LR policy entity performs local routing authorization for the MS1, and adds a local routing authorization result to an LR authorization response and sends the response to the LR executing entity.

The local routing authorization result of the MS1 is specifically that the local routing authorization of the MS1 succeeds or fails.

206: The LR executing entity sends a service flow establishment response to the MS1.

207: When the local routing authorization result of the MS1 is success, the LR executing entity initiates an LR authorization request to the second LR policy entity that the MS2 belongs to, requesting the second LR policy entity to perform local routing authorization for the MS2.

The second LR policy entity is a network entity responsible for performing authorization or providing policies for the local routing of the MS2, for example, an anchor authenticator, a service flow authorizing unit, and a PCRF.

208. The second LR policy entity determines, according to the subscription information of the MS2 and/or the policy of the operator that the MS2 belongs to and so on, whether to allow to execute local routing for the service flow corresponding to the service flow information of the MS2; if the second LR policy entity determines to allow to execute local routing for the service flow corresponding to the service flow information of the MS2, the second LR policy entity executes step 209; otherwise, the second LR policy entity performs processing according to the method for transmitting service flows in the prior art.

209: The second LR policy entity performs the local routing authorization for the MS2, and adds a local routing authorization result to an LR authorization response and sends the response to the LR executing entity.

The local routing authorization result of the MS2 is specifically that the local routing authorization of the MS2 is success or failure.

210: When the local routing authorization result of the MS2 is success, the LR executing entity sends a service flow establishment request carrying service flow information of the MS2 to the MS2, requesting to establish a data bearer for transmitting the service flow.

211: The MS2 returns a service flow establishment response to the LR executing entity.

212: The LR executing entity transmits the service flow corresponding to the service flow information of the MS1 and the service flow corresponding to the service flow information of the MS2 by performing the local routing.

Optionally, the method may further include the following steps:

213: The LR executing entity sends a local routing notification message to the first LR policy entity and the second LR policy entity, notifying the first LR policy entity and the second LR policy entity that the local routing has been executed.

214: The first LR policy entity and the second LR policy entity return a local routing notification response message to the LR executing entity.

It should be noted that the above first LR policy entity and second LR policy entity may be two independent entities or may also be integrated into an independent entity, which is not limited herein. In the method for local routing authorization according to the embodiment of the present invention, the LR executing entity performs the local routing authorization for the MS1 and MS2 according to the service flow information of the MS1, so that the authorization for local routing is implemented and thus the requirement for authorizing local routing is satisfied. Alternatively, the LR executing entity may first perform the local routing authorization for the MS1, and then perform the local routing authorization for the MS2 after the local routing authorization for the MS1 is successful, so as to save network information resources.

Embodiment 3

Figure 4:
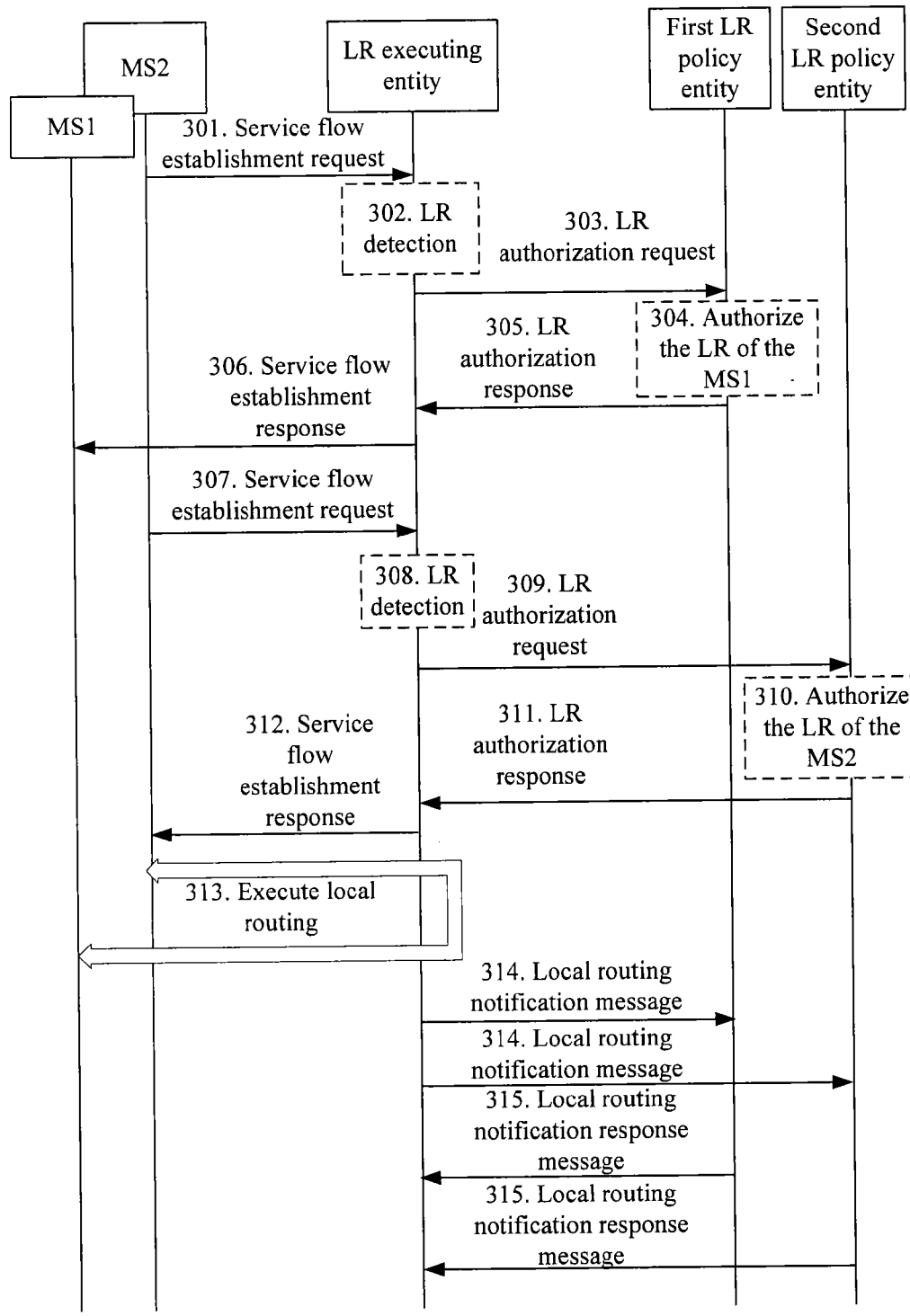
FIG. 4 is a flowchart of a method for local routing authorization according to Embodiment 3 of the present invention.

As shown in FIG. 4, the embodiment of the present invention provides a method for local routing authorization. After the LR executing entity detects a service flow that can be transmitted by performing local routing, the LR executing entity performs local routing authorization for the MS1 and the MS2 which is a correspondent node of the MS1; after the local routing authorization for the MS1 and the MS2 is successful, the LR executing entity transmits the service flow between the MS1 and the MS2 by performing the local routing. The method includes the following steps:

301: The MS1 sends a service flow establishment request carrying service flow information to the LR executing entity, requesting to establish a data bearer for transmitting a service flow.

The LR executing entity is a network entity that executes a local forwarding of service flows in the network, for example, the Serving ASN-GW, BS, and Anchor ASN-GW etc. in the WiMAX network; or the SGSN and Serving GW etc. in the 3GPP network. The service flow information indicates the information that needs to be created through application-layer negotiation between the MS1 and the MS2 for executing the communication service between the MS1 and the MS2. The service flow information may be, for example, an IP quintuple (source IP address, destination IP address, source port number, destination port number, protocol type) corresponding to the service flow.

302: The LR executing entity determines, according to the correspondent node information included in the service flow information of the MS1, whether local routing can be executed for the service flow corresponding to the service flow information of the MS1, and if so, executes step 303; otherwise, the LR executing entity performs processing according to the method for transmitting service flows in the prior art.

The correspondent node information included in the service flow information of the MS1 includes an IP address and a protocol type of the correspondent node of the MS1. Specifically, according to the correspondent node information included in the service flow information of the MS1, if it is determined that the correspondent node of the MS1 is the MS2, and the LR executing entities of the MS1 and MS2 are the same physical entity, it can be concluded that the local routing can be executed for the service flow corresponding to the service flow information of the MS1; otherwise, the local routing cannot be executed for the service flow corresponding to the service flow information of the MS1.

303: The LR executing entity sends an LR authorization request to the first LR policy entity to which the MS1 belongs, requesting the first LR policy entity to perform local routing authorization for the MS1.

The first LR policy entity is a network entity responsible for performing authorization or providing policies for the local routing of the MS1, for example, an anchor authenticator, a service flow authorizing unit, and a PCRF etc.

304: The first LR policy entity determines, according to the subscription information of the MS1 and/or a policy of the operator that the MS1 belongs to etc., whether to allow to execute local routing for the service flow corresponding to the service flow information of the MS1; if the first LR policy entity determines to allow to execute local routing for the service flow corresponding to the service flow information of the MS1, the first LR policy entity executes step 305; otherwise, the first LR policy entity performs processing according to the method for transmitting service flows in the prior art.

305: The first LR policy entity performs local routing authorization for the MS1, and adds a local routing authorization result to an LR authorization response and sends the response to the LR executing entity.

The local routing authorization result of the MS1 is specifically that the local routing authorization of the MS1 is success or failure.

306: The LR executing entity sends a service flow establishment response to the MS1, and then executes step 313.

307: The MS2 sends a service flow establishment request carrying service flow information to the LR executing entity, requesting to establish a data bearer for transmitting a service flow.

308: The LR executing entity determines, according to the correspondent node information included in the service flow information of the MS2, whether local routing can be executed for the service flow corresponding to the service flow information of the MS2, and if so, executes step 309; otherwise, the LR executing entity performs processing according to the method for transmitting service flows in the prior art.

The correspondent node information included in the service flow information of the MS2 includes an IP address and a protocol type of the correspondent node of the MS2. Specifically, according to the correspondent node information included in the service flow information of the MS2, if it is determined that the correspondent node of the MS2 is the MS1, and the LR executing entities of the MS2 and MS1 are the same physical entity, it is concluded that the local routing can be executed for the service flow corresponding to the service flow information of the MS2; otherwise, it is concluded that the local routing cannot be executed for the service flow corresponding to the service flow information of the MS2.

Optionally, after determining, according to the correspondent node information included in the service flow information of the MS2, that the local routing can be executed for the service flow corresponding to the service flow information of the MS2, the LR executing entity may further determine, according to the local routing authorization result of the MS1, whether to initiate local routing authorization for the MS2; after determining, according to the local routing authorization result of the MS1, that local routing authorization may be initiated for the MS2, the LR executing entity executes step 309. Specifically, in this embodiment, when the local routing authorization result of the MS1 is success, the LR executing entity determines that local routing authorization may be initiated for the MS2.

309: The LR executing entity sends an LR authorization request to the second LR policy entity that the MS2 belongs to, requesting the second LR policy entity to perform local routing authorization for the MS2.

The second LR policy entity is a network entity responsible for performing authorization or providing policies for the local routing of the MS2, for example, an anchor authenticator, a service flow authorizing unit, and a PCRF etc.

310: The second LR policy entity determines, according to the subscription information of the MS2 and/or a policy of the operator that the MS2 belongs to etc., whether to allow to execute local routing on the service flow corresponding to the service flow information of the MS2; if the second LR policy entity determines to allow to execute local routing on the service flow corresponding to the service flow information of the MS2, the second LR policy entity executes step 311; otherwise, the second LR policy entity performs processing according to the method for transmitting service flows in the prior art.

311: The second LR policy entity performs a local routing authorization for the MS2, and adds a local routing authorization result to an LR authorization response and sends the response to the LR executing entity.

The local routing authorization result of the MS2 is specifically that the local routing authorization of the MS2 is success or failure.

312: The LR executing entity sends a service flow establishment response to the MS2, and then executes step 313.

313: When the local routing authorization result of the MS1 is success, and the local routing authorization result of the MS2 is success, the LR executing entity transmits the service flow corresponding to the service flow information of the MS1 and the service flow corresponding to the service flow information of the MS2 by performing the local routing.

It should be noted that the above steps 301-306 and steps 307-312 may be executed in any sequence, and that steps 301-306 and steps 307-312 may be executed concurrently.

Optionally, the method may further include the following steps:

314: The LR executing entity sends a local routing notification message to the first LR policy entity and the second LR policy entity respectively, notifying the first LR policy entity and the second LR policy entity that the local routing has been executed.

315: The first LR policy entity and the second LR policy entity return a local routing notification response message to the LR executing entity, respectively.

It should be noted that the above first LR policy entity and second LR policy entity may be two independent entities or may also be integrated into an independent entity, which is not limited herein.

In the method for local routing authorization according to the embodiment of the present invention, the LR executing entity performs the local routing authorization for the MS1 and MS2 according to the service flow information of the MS1 and MS2, so that the authorization for local routing is implemented and thus the requirement for authorizing local routing is satisfied. Alternatively, the LR executing entity may perform the local routing authorization for the MS1 and MS2 concurrently, so as to save the time of local routing authorization.

For better understanding of the embodiment of the present invention, further description is provided based on the following example: In the WiMAX network, the Anchor ASN-GW is an LR executing entity, the anchor authenticator is an LR policy entity, the base station and authenticator that correspond to the MS1 are BS1 and authenticator 1, respectively, the base station and authenticator that correspond to the correspondent node MS2 of the MS1 are BS2 and authenticator 2, respectively, and the MS1 and MS2 are served by the same Anchor ASN-GW.

Embodiment 4

Figure 5:
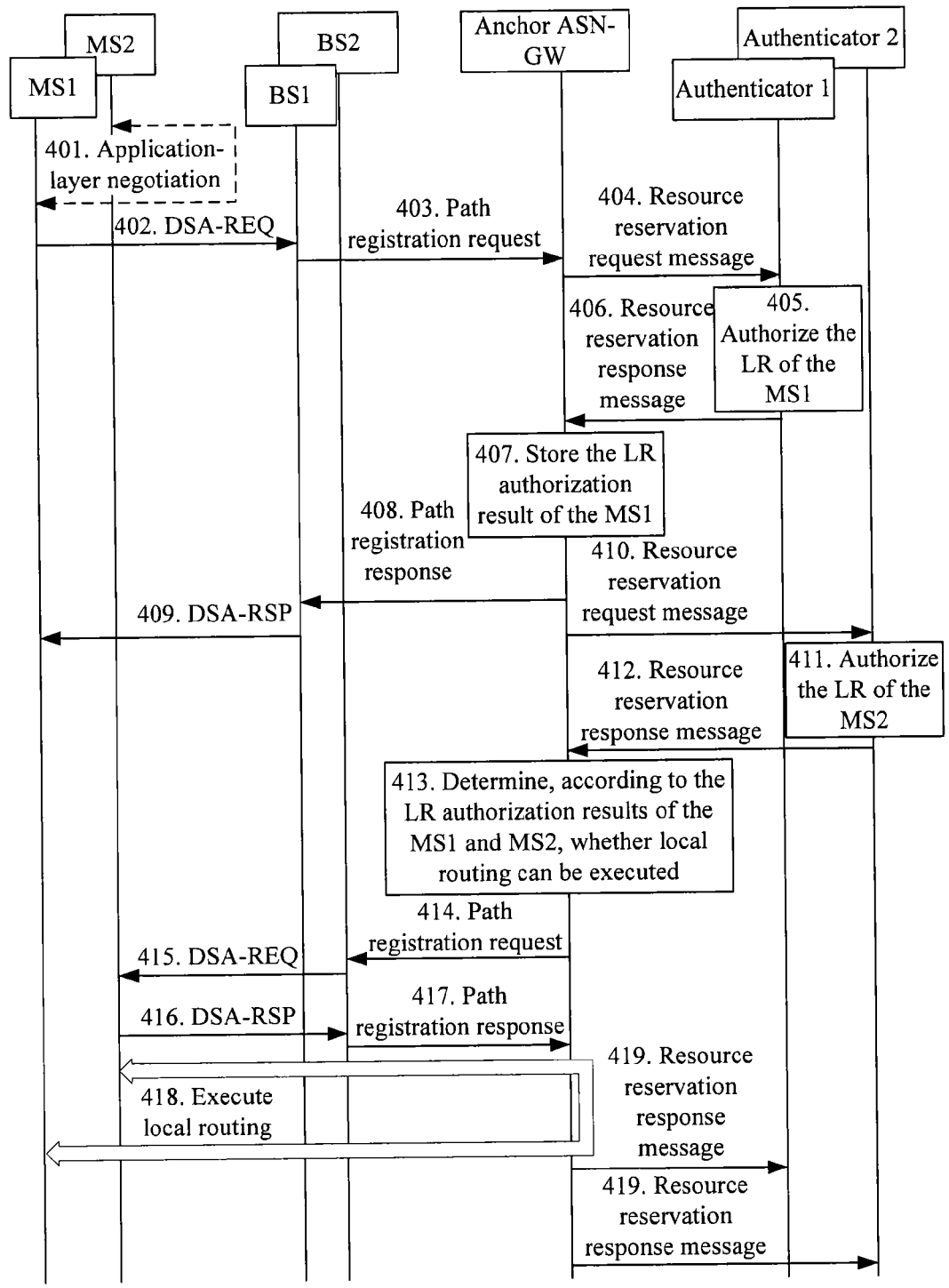
FIG. 5 is a flowchart of a method for local routing authorization according to Embodiment 4 of the present invention.

As shown in FIG. 5, the embodiment of the present invention provides a method for local routing authorization, including the following steps:

401: The MS1 and the correspondent node of MS1, i.e., MS2 determine, through application-layer negotiation, service flow information that needs to be created for executing the communication service between the MS1 and the MS2.

The service flow information in the embodiment of the present invention is specifically an IP quintuple corresponding to the service flow, etc.

402: The MS1 sends a DSA-REQ (Dynamic Service Addition Request to the BS1, requesting to establish a radio bearer for transmitting a service flow.

The DSA-REQ includes the service flow information determined through negotiation in step 401.

403: The BS1 sends a Path_Reg_Req (Path Registration Request) to the Anchor ASN-GW, requesting to establish a network bearer for transmitting the service flow.

The Path_Reg_Req includes the service flow information determined through negotiation in step 401.

404: The Anchor ASN-GW determines, according to the service flow information such as the IP quintuple of the MS1, that the correspondent node of the MS1, i.e., the MS2, is also served by the Anchor ASN-GW, and determines that local routing can be executed for the service flow corresponding to the service flow information of the MS1; the Anchor ASN-GW sends an RR_req (Resource-Reservation Request) to the authenticator 1, where the RR_req includes an LR req (local routing request indication).

405: According to the subscription information of the MS1 and the policy and service information of the operator that the MS1 belongs to etc., the authenticator 1 determines the quality of service (QoS) information, for example, the bandwidth and delay of the service flow, and determines whether to allow to execute local routing on the service flow corresponding to the service flow information of the MS1.

406: The authenticator 1 returns an RR_rsp (Resource-Reservation Response) to the Anchor ASN-GW, where the RR_rsp includes the authorized QoS of the service flow and the local routing authorization result of the MS1.

407: The Anchor ASN-GW stores the local routing authorization result of the MS1.

408: The Anchor ASN-GW returns a Path_Reg_Rsp (Path Registration Response) to the BS1.

409: The BS1 returns a DSA-RSP (Dynamic Service Addition Response) to the MS1, and establishes a data bearer of the MS1.

410: When the local routing authorization result of the MS1 is success, the Anchor ASN-GW sends an RR_req to the authenticator 2, where the RR rep includes an LR req.

411: The authenticator 2 performs local routing authorization for the MS2.

412: The authenticator 2 notifies the Anchor ASN-GW of the local routing authorization result of the MS2 through an RR_rsp (Resource Reservation Response).

The RR_rsp includes an LR rsp (local routing response indication).

413: The Anchor ASN-GW determines, according to the local routing authorization results of the MS1 and MS2, whether the service flow corresponding to the service flow information of the MS1 and the service flow corresponding to the service flow information of the MS2 can be transmitted by performing the local routing.

Specifically, when the local routing authorization result of the MS1 is success and the local routing authorization result of the MS2 is also success, the Anchor ASN-GW determines that the service flow corresponding to the service flow information of the MS1 and the service flow corresponding to the service flow information of the MS2 can be transmitted by performing the local routing; otherwise, the Anchor ASN-GW determines that the service flow corresponding to the service flow information of the MS1 and the service flow corresponding to the service flow information of the MS2 cannot be transmitted by performing the local routing.

414: After the Anchor ASN-GW determines that the service flow corresponding to the service flow information of the MS1 and the service flow corresponding to the service flow information of the MS2 can be transmitted by performing local routing, the Anchor ASN-GW sends a Path_Reg_Req (Path Registration Request) to the BS2, and establishes a network bearer for transmitting the service flow for the MS2, where the Path_Reg_Req includes the IP quintuple information of the service flow.

415: The BS2 sends a DSA-REQ (Dynamic Service Addition Request) to the MS2, where the DSA-REQ is used to establish a radio bearer corresponding to the MS2.

416: The MS2 returns a DSA-RSP (Dynamic Service Addition Response).

417: The BS2 returns a Path_Reg_Rsp (Path Registration Response) to the Anchor ASN-GW.

418: The Anchor ASN-GW transmits the service flow corresponding to the service flow information of the MS1 and the service flow corresponding to the service flow information of the MS2 by performing the local routing.

419: The Anchor ASN-GW sends an RR_ack (Resource-Reservation Acknowledge) to the authenticator 1 and authenticator 2 respectively, indicating that the local routing has been executed (that is, the Anchor ASN-GW notifies the authenticator 1 and authenticator 2 that the service flow corresponding to the service flow information of the MS1 and the service flow corresponding to the service flow information of the MS2 are already transmitted by performing the local routing).

In the method for local routing authorization according to the embodiment of the present invention, the Anchor ASN-GW performs the local routing authorization for the MS1 and MS2 according to the service flow information of the MS1, so that the authorization for local routing is implemented and thus the requirement for authorizing local routing is satisfied.

Alternatively, the Anchor ASN-GW may first perform the local routing authorization for the MS1, and then perform the local routing authorization for the MS2 after the local routing authorization for the MS1 is successful, so as to save network information resources.

For better understanding of the embodiment of the present invention, further description is provided based on the following example: In the WiMAX network, the Anchor ASN-GW is an LR executing entity, the PCRF is an LR policy entity, the base station, PCEF (Policy and Charging Enforcement Function, policy and charging enforcement function), PCRF, and AAA (Access Network-Authentication, Accounting, Authorization Server, access network-authentication, accounting, authorization server) that correspond to the MS1 are BS1, A-PCEF1, PCRF1, and AAA1, respectively, the base station, PCEF, PCRF, and AAA that correspond to the correspondent node MS2 of the MS1 are BS2, A-PCEF2, PCRF2, and AAA2, respectively, and the MS1 and MS2 are served by the same Anchor ASN-GW.

Embodiment 5

Figure 6:
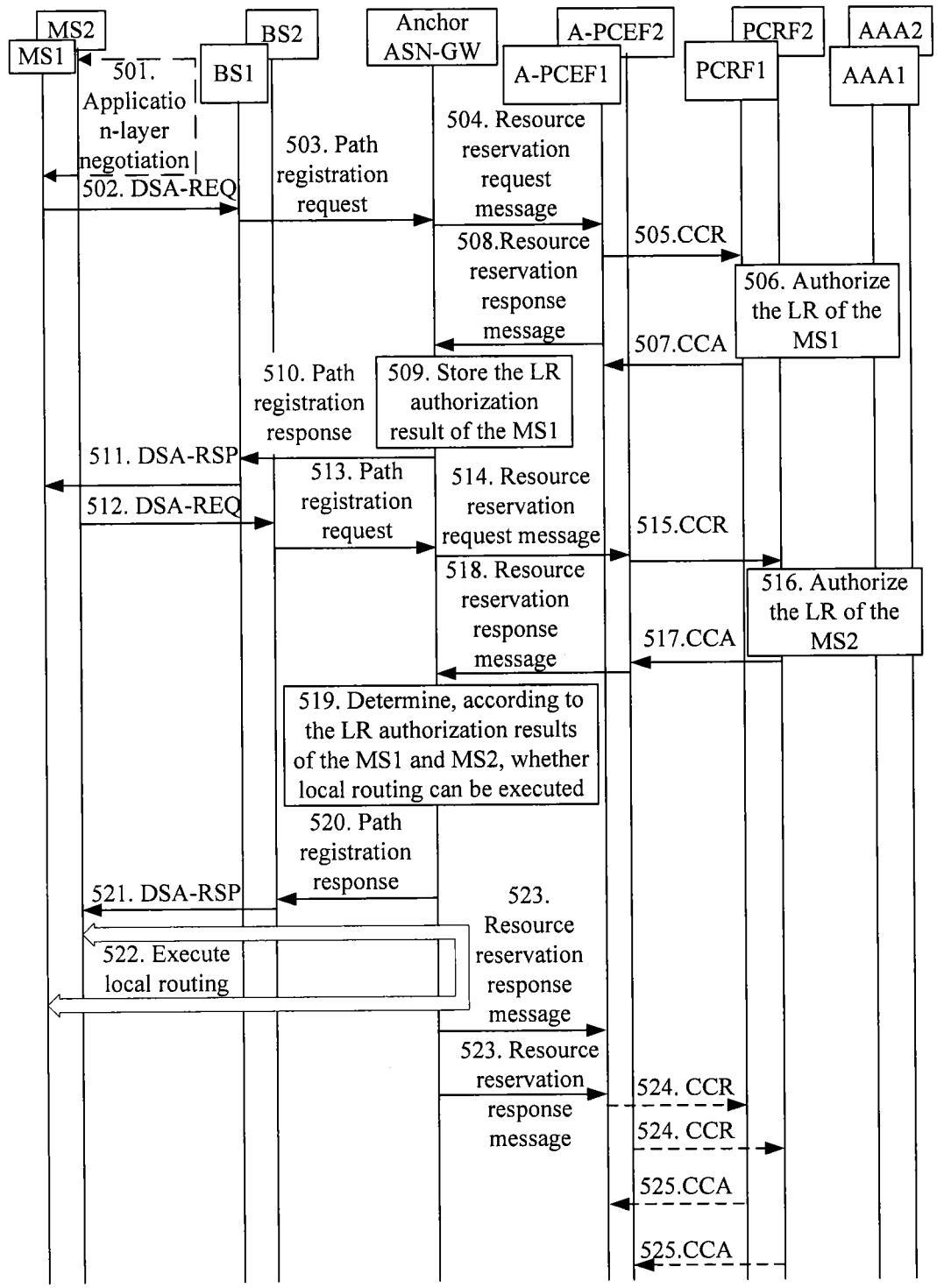
FIG. 6 is a flowchart of a method for local routing authorization according to Embodiment 5 of the present invention.

As shown in FIG. 6, the embodiment of the present invention provides a method for local routing authorization, including the following steps:

501: The MS1 and the correspondent node of the MS1, i.e., the MS2, determine, through an application-layer negotiation, the service flow information that needs to be created for executing the communication service between the MS1 and the MS2.

The service flow information in the embodiment of the present invention is specifically an IP quintuple corresponding to the service flow, and so on.

502: The MS1 sends a DSA-REQ to the BS1, requesting to establish a radio bearer for transmitting a service flow.

The DSA-REQ includes the service flow information determined through negotiation in step 501.

503: The BS1 sends a Path_Reg_Req to the Anchor ASN-GW, requesting to establish a network bearer for transmitting the service flow.

The Path_Reg_Req includes the service flow information determined through negotiation in step 501.

504: The Anchor ASN-GW determines, according to the information such as the IP quintuple, that the correspondent node (i.e. MS2) of the MS1 is also served by the Anchor ASN-GW, and determines that local routing can be executed for the service flow corresponding to the service flow information of the MS1; the Anchor ASN-GW sends an RR_req to the A-PCEF1, where the RR_req includes an LR req (local routing request indication).

505: The A-PCEF1 sends a CCR (Credit-Control Request) message to the PCRF1, requesting the PCRF1 to perform local routing authorization for the MS1, where the CCR message includes an LR req and a TFT (Traffic Flow Template).

506: According to the subscription information of the MS1 and the policy and service information of the operator that the MS1 belongs to etc., the PCRF1 determines the QoS information such as the bandwidth and delay, and determines whether to allow to execute local routing on the service flow corresponding to the service flow information of the MS1.

In this process, the PCRF1 may interact with the AAA1.

507: The PCRF1 notifies the local routing authorization result of the MS1 to the A-PCEF1 of the MS1 through CCA (Credit-Control-Answer) message, where the local routing authorization result of the MS1 may be included in a PCC (Policy and Charging Control) rule.

508: The A-PCEF1 sends an RR_rsp to the Anchor ASN-GW, where the RR_rsp includes the authorized QoS of the service flow and the local routing authorization result of the MS1.

509: The Anchor ASN-GW stores the local routing authorization result of the MS1.

510: The Anchor ASN-GW returns a Path_Reg_Rsp to the BS1.

511: The BS1 returns a DSA-RSP to the MS1 and establishes a data bearer of the MS1. Then step 519 is executed.

512: The MS2 sends a DSA-REQ to the BS2, requesting to establish a radio bearer for transmitting a service flow.

The DSA-REQ includes the service flow information determined through negotiation in step 501.

513: The BS2 sends a Path_Reg_Req to the Anchor ASN-GW, requesting to establish a network bearer for transmitting the service flow.

The Path_Reg_Req includes the service flow information determined through negotiation in step 501.

514: The Anchor ASN-GW determines, according to the service flow information such as the IP quintuple of the MS2, that the correspondent node (i.e., MS1) of the MS2 is also served by the Anchor ASN-GW, and determines that local routing can be executed for the service flow corresponding to the service flow information of the MS2; the Anchor ASN-GW sends an RR_req to the A-PCEF2, where the RR_req includes an LR req.

Optionally, after the Anchor ASN-GW determines, according to the service flow information such as the IP quintuple of the service flow, that the correspondent node (i.e., MS1) of the MS2 is also served by the Anchor ASN-GW and that local routing can be executed for the service flow corresponding to the service flow information of the MS2, the Anchor ASN-GW may further determine, according to the local routing authorization result of the MS1 stored in step 509, whether local routing authorization may be initiated for the MS2 (namely, determine whether to send an LR_req to the A-PCEF2); after determining, according to the local routing authorization result of the MS1, that local routing authorization may be initiated for the MS2, the Anchor ASN-GW sends an RR_req to the A-PCEF2, where the RR_req includes an LR req. Specifically, in this embodiment, when the local routing authorization result of the MS1 is success, the Anchor ASN-GW determines that local routing authorization may be initiated for the MS (namely, determines that an LR_req may be sent to the A-PCEF2).

515: The A-PCEF2 sends a CCR message to the PCRF2, requesting the PCRF2 to perform local routing authorization for the MS2, where the CCR message includes an LR req.

516: According to the subscription information of the MS2 and the policy and service information of the operator that the MS2 belongs to, and so on, the PCRF2 determines the QoS information such as the bandwidth and delay of the service flow, and whether to allow to execute local routing on the service flow corresponding to the service flow information of the MS2.

In this process, the PCRF2 may need to interact with the AAA2.

517: The PCRF2 notifies the local routing authorization result of the MS2 to the A-PCEF2 of the MS2 through a CCA message, where the local routing authorization result of the MS2 may be included in a PCC rule.

518: The A-PCEF2 returns an RR_rsp to the Anchor ASN-GW, where the RR_rsp includes the authorized QoS of the service flow and the local routing authorization result of the MS2. Then step 519 is executed.

519: The Anchor ASN-GW determines, according to the local routing authorization results of the MS1 and MS2, whether the service flow corresponding to the service flow information of the MS1 and the service flow corresponding to the service flow information of the MS2 can be transmitted by performing the local routing.

Specifically, when the local routing authorization result of the MS1 is success and the local routing authorization result of the MS2 is also success, the Anchor ASN-GW determines that the service flow corresponding to the service flow information of the MS1 and the service flow corresponding to the service flow information of the MS2 can be transmitted by performing the local routing; otherwise, the Anchor ASN-GW determines that the service flow corresponding to the service flow information of the MS1 and the service flow corresponding to the service flow information of the MS2 cannot be transmitted by performing local routing.

520: After the Anchor ASN-GW determines that the service flow corresponding to the service flow information of the MS1 and the service flow corresponding to the service flow information of the MS2 can be transmitted by performing the local routing, the Anchor ASN-GW returns a Path_Reg_Rsp to the BS2.

521: The BS2 returns a DSA-RSP to the MS2, and establishes a data bearer of the MS2.

522: The Anchor ASN-GW transmits the service flow corresponding to the service flow information of the MS1 and the service flow corresponding to the service flow information of the MS2 by performing local routing.

523: The Anchor ASN-GW returns an RR_ack to the A-PCEF1 and A-PCEF2 respectively, indicating that the local routing has been executed (that is, the Anchor ASN-GW notifies the A-PCEF1 and A-PCEF2 that the service flow corresponding to the service flow information of the MS1 and the service flow corresponding to the service flow information of the MS2 are already transmitted by performing local routing).

Optionally, the method may further include the following steps:

524: The A-PCEF1 and A-PCEF2 send a CCR message to the PCRF1 and PCRF2, respectively, indicating that the local routing has been executed.

525: The PCRF1 and PCRF2 return a CCA message to the A-PCEF1 and A-PCEF2, respectively.

It should be noted that in this embodiment, the A-PCEF1 and the A-PCEF2, the PCRF1 and the PCRF2, and the AAA1 and the AAA2 may be the same physical network element, which does not affect the applicability of this embodiment.

With the method for local routing authorization according to the embodiment of the present invention, the Anchor ASN-GW performs local routing authorization for the MS1 and MS2 according to the service flow information of the MS1 and MS2, which implements authorization for local routing and may satisfy the requirement for authorizing local routing. In addition, the Anchor ASN-GW may perform local routing authorization for the MS1 and MS2 concurrently, which may save the time of local routing authorization.

Embodiment 6

Figure 7A:
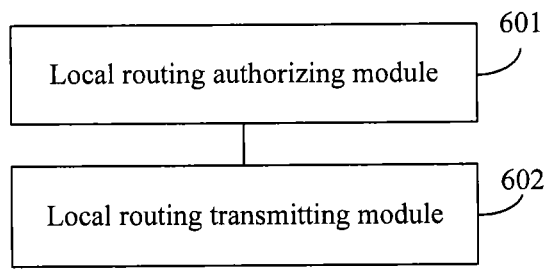
FIG. 7a is a schematic structural diagram of an apparatus for local routing authorization according to Embodiment 6 of the present invention.

As shown in FIG. 7a, the embodiment of the present invention provides an apparatus for local routing authorization (e.g., an LR executing entity), including:

a local routing authorizing module 601, configured to respectively initiate a local routing authorization request to a first local routing policy entity and a second local routing policy entity according to service flow information of a first mobile station or according to service flow information of the first mobile station and a second mobile station, so as to enable the first local routing policy entity to perform local routing authorization for the first mobile station and enable the second local routing policy entity to perform local routing authorization for the second mobile station; and a local routing transmitting module 602, configured to transmit, by performing local routing, a service flow corresponding to the service flow information of the first mobile station and a service flow corresponding to the service flow information of the second mobile station, when a local routing authorization result of the first mobile station and a local routing authorization result of the second mobile station are both success.

Further, the local routing authorizing module 601 includes:

a first service flow information obtaining unit, configured to obtain the service flow information of the first mobile station;

a first local routing authorizing unit, configured to initiate, according to the service flow information of the first mobile station obtained by the first service flow information obtaining unit, a request for performing local routing authorization for the first mobile station to the first local routing policy entity that the first mobile station belongs to, so as to enable the first local routing policy entity to perform local routing authorization for the first mobile station; and a second local routing authorizing unit, configured to initiate, when the local routing authorization result of the first mobile station is success, a request for performing local routing authorization for the second mobile station to the second local routing policy entity that the second mobile station belongs to, so as to enable the second local routing policy entity to perform local routing authorization for the second mobile station.

Further, the local routing authorizing module 601 includes:

a data bearer establishing unit, configured to establish a data bearer between the local end (i.e., the apparatus for local routing authorization) and the second mobile station when the local routing authorization result of the second mobile station is success.

Further, the local routing authorizing module 601 includes:

a first service flow information obtaining unit, configured to obtain the service flow information of the first mobile station;

a first local routing authorizing unit, configured to initiate, according to the service flow information of the first mobile station obtained by the first service flow information obtaining unit, a request for performing local routing authorization for the first mobile station to the first local routing policy entity that the first mobile station belongs to, so as to enable the first local routing policy entity to perform local routing authorization for the first mobile station;

a second service flow information obtaining unit, configured to obtain the service flow information of the second mobile station; and a third local routing authorizing unit, configured to initiate, according to the service flow information of the second mobile station obtained by the second service flow information obtaining unit, a request for performing local routing authorization for the second mobile station to the second local routing policy entity that the second mobile station belongs to, so as to enable the second local routing policy entity to perform local routing authorization for the second mobile station.

Further, the local routing authorizing module 601 includes:

a first service flow information obtaining unit, configured to obtain the service flow information of the first mobile station;

a first local routing authorizing unit, configured to initiate, according to the service flow information of the first mobile station obtained by the first service flow information obtaining unit, a request for performing local routing authorization for the first mobile station to the first local routing policy entity that the first mobile station belongs to, so that the first local routing policy entity performs local routing authorization for the first mobile terminal;

a second service flow information obtaining unit, configured to obtain the service flow information of the second mobile terminal; and a fourth local routing authorizing unit, configured to initiate, according to the local routing authorization result of the first mobile terminal and the service flow information of the second mobile terminal obtained by the second service flow information obtaining unit, a request for performing local routing authorization for the second mobile terminal to the second local routing policy entity that the second mobile terminal belongs to, so that the second local routing policy entity performs local routing authorization for the second mobile station.

Further, the first local routing authorizing unit includes:

a first determining subunit, configured to determine, according to the correspondent node information included in the service flow information of the first mobile station obtained by the first service flow information obtaining unit, whether local routing can be executed for the service flow corresponding to the service flow information of the first mobile station; and a first local routing authorizing subunit, configured to initiate, when the first determining subunit determines that local routing can be executed for the service flow corresponding to the service flow information of the first mobile station, a request for performing local routing authorization for the first mobile station to the first local routing policy entity that the first mobile station belongs to, so as to enable the first local routing policy entity to perform local routing authorization for the first mobile station.

Further, the third local routing authorizing unit includes:

a second determining subunit, configured to determine, according to the correspondent node information included in the service flow information of the second mobile station obtained by the second service flow information obtaining unit, whether local routing can be executed for the service flow corresponding to the service flow information of the second mobile station; and a second local routing authorizing subunit, configured to initiate, when the second determining subunit determines that local routing can be executed for the service flow corresponding to the service flow information of the second mobile station, a request for performing local routing authorization for the second mobile station to the second local routing policy entity that the second mobile station belongs to, so as to enable the second local routing policy entity to perform local routing authorization for the second mobile station.

Further, the fourth local routing authorizing unit includes:

a third determining subunit, configured to determine, according to the correspondent node information included in the service flow information of the second mobile station obtained by the second service flow information obtaining unit, whether local routing can be executed for the service flow corresponding to the service flow information of the second mobile station;

a fourth determining subunit, configured to determine, when the third determining subunit determines that local routing can be executed for the service flow corresponding to the service flow information of the second mobile station, whether the local routing authorization result of the first mobile station is success; and a third local routing authorizing subunit, configured to initiate, when the fourth determining subunit determines that the local routing authorization result of the first mobile station is success, a request for performing local routing authorization for the second mobile station to the second local routing policy entity that the second mobile station belongs to, so as to enable the second local routing policy entity to perform local routing authorization for the second mobile station.

Figure 7B:
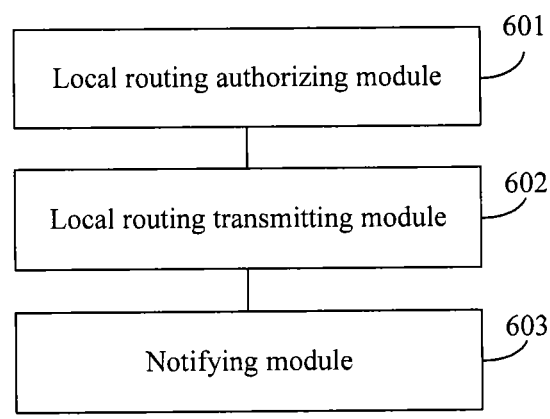
FIG. 7b is a schematic structural diagram of another apparatus for local routing authorization according to Embodiment 6 of the present invention.

Further, as shown in FIG. 7*b*, the apparatus includes:

a notifying module 603, configured to respectively send a notification message to the first local routing policy entity and the second local routing policy entity after the local routing transmitting module 602 transmits the service flow corresponding to the service flow information of the first mobile station and the service flow corresponding to the service flow information of the second mobile station by performing local routing, where the notification message indicates that the service flow corresponding to the service flow information of the first mobile station and the service flow corresponding to the service flow information of the second mobile station are transmitted by performing local routing.

With the apparatus for local routing authorization in the embodiment of the present invention, local routing authorization is performed for the first mobile station and the second mobile station according to the service flow information of the first mobile station or according to the service flow information of the first mobile station and the second mobile station, so that authorization for local routing is implemented and thus the requirement for authorizing local routing is satisfied. Furthermore, local routing authorization may be first performed for the first mobile station; after local routing authorization for the first mobile station is successful, local routing authorization is performed for the second mobile station, so as to save network information resources. Alternatively, the local routing authorization may be performed for the first mobile station and the second mobile station concurrently, so as to save the time of local routing authorization.

Embodiment 7

Figure 8:
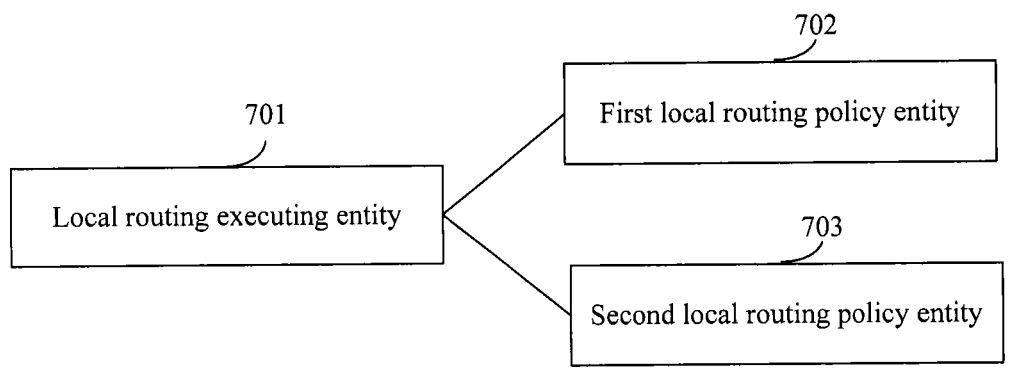
FIG. 8 is a schematic structural diagram of a system for local routing authorization according to Embodiment 7 of the present invention.

As shown in FIG. 8, the embodiment of the present invention provides a system for local routing authorization, including: a local routing executing entity 701, a first local routing policy entity 702, and a second local routing policy entity 703.

The local routing executing entity 701 is configured to respectively initiate a local routing authorization request to the first local routing policy entity 702 and the second local routing policy entity 703 according to service flow information of a first mobile station or according to service flow information of the first mobile station and a second mobile station; and when a local routing authorization result of the first mobile station and a local routing authorization result of the second mobile station are both success, transmit, by performing local routing, a service flow corresponding to the service flow information of the first mobile station and a service flow corresponding to the service flow information of the second mobile station;

the first local routing policy entity 702 is configured to perform the local routing authorization for the first mobile station after receiving the local routing authorization request initiated by the local routing executing entity 701; and the second local routing policy entity 703 is configured to perform the local routing authorization for the second mobile station after receiving the local routing authorization request initiated by the local routing executing entity 701.

Further, the local routing executing entity 701 is specifically configured to obtain the service flow information of the first mobile station, and initiate, according to the service flow information of the first mobile station, a request for performing local routing authorization for the first mobile station to the first local routing policy entity 702; after the first local routing policy entity 702 successfully performs the local routing authorization for the first mobile station, initiate a request for performing the local routing authorization for the second mobile station to the second local routing policy entity 703; and when a local routing authorization result of the first mobile station and a local routing authorization result of the second mobile station are both success, transmit, by performing the local routing, the service flow corresponding to the service flow information of the first mobile station and the service flow corresponding to the service flow information of the second mobile station;

the first local routing policy entity 702 is specifically configured to: after receiving the request for performing local routing authorization for the first mobile station from the local routing executing entity 701, determine, according to the subscription information of the first mobile station and/or the policy of the operator that the first mobile station belongs to, whether to allow to execute local routing on the service flow corresponding to the service flow information of the first mobile station; and after determining to allow to execute local routing on the service flow corresponding to the service flow information of the first mobile station, perform local routing authorization for the first mobile station; and the second local routing policy entity 703 is specifically configured to: after receiving the request for performing local routing authorization for the second mobile station from the local routing executing entity 701, determine, according to the subscription information of the second mobile station and/or the policy of the operator that the second mobile station belongs to, whether to allow to execute local routing on the service flow corresponding to the service flow information of the second mobile station; and after determining to allow to execute local routing on the service flow corresponding to the service flow information of the second mobile station, perform local routing authorization for the second mobile station.

Further, the local routing executing entity 701 is specifically configured to obtain the service flow information of the first mobile station, and initiate, according to the service flow information of the first mobile station, a request for performing local routing authorization for the first mobile station to the first local routing policy entity 702; obtain the service flow information of the second mobile station, and initiate, according to the service flow information of the second mobile station, a request for performing local routing authorization for the second mobile station to the second local routing policy entity 703; and when a local routing authorization result of the first mobile station and a local routing authorization result of the second mobile station are both success, transmit, by performing local routing, the service flow corresponding to the service flow information of the first mobile station and the service flow corresponding to the service flow information of the second mobile station;

the first local routing policy entity 702 is specifically configured to: after receiving the request for performing local routing authorization for the first mobile station from the local routing executing entity 701, determine, according to the subscription information of the first mobile station and/or the policy of the operator that the first mobile station belongs to, whether to allow to execute local routing on the service flow corresponding to the service flow information of the first mobile station; and after determining to allow to execute local routing on the service flow corresponding to the service flow information of the first mobile station, perform local routing authorization for the first mobile station; and the second local routing policy entity 703 is configured to: after receiving the request for performing local routing authorization for the second mobile station from the local routing executing entity 701, determine, according to the subscription information of the second mobile station and/or the policy of the operator that the second mobile station belongs to, whether to allow to execute local routing on the service flow corresponding to the service flow information of the second mobile station; and after determining to allow to execute local routing on the service flow corresponding to the service flow information of the second mobile station, perform local routing authorization for the second mobile station.

Further, the local routing executing entity 701 is specifically configured to obtain the service flow information of the first mobile station, and initiate, according to the service flow information of the first mobile station, a request for performing local routing authorization for the first mobile station to the first local routing policy entity 702; and obtain the service flow information of the second mobile station, and according to the service flow information of the second mobile station and the local routing authorization result of the first mobile station, initiate a request for performing local routing authorization for the second mobile station to the second local routing policy entity 703;

the first local routing policy entity 702 is specifically configured to: after receiving the request for performing local routing authorization for the first mobile station from the local routing executing entity 701, determine, according to the subscription information of the first mobile station and/or the policy of the operator that the first mobile station belongs to, whether to allow to execute local routing on the service flow corresponding to the service flow information of the first mobile station; and after determining to allow to execute local routing on the service flow corresponding to the service flow information of the first mobile station, perform local routing authorization for the first mobile station; and the second local routing policy entity 703 is specifically configured to: after receiving the request for performing local routing authorization for the second mobile station from the local routing executing entity 701, determine, according to the subscription information of the second mobile station and/or the policy of the operator that the second mobile station belongs to, whether to allow to execute local routing on the service flow corresponding to the service flow information of the second mobile station; and after determining to allow to execute local routing on the service flow corresponding to the service flow information of the second mobile station, perform local routing authorization for the second mobile station.

With the system for local routing authorization in the embodiment of the present invention, the local routing executing entity performs local routing authorization for the first mobile station and the second mobile station according to the service flow information of the first terminal or according to the service flow information of the first mobile station and the second mobile station, so that the authorization for local routing is implemented and thus the requirement for authorizing local routing is satisfied. Alternatively, the local routing executing entity may first perform local routing authorization for the first mobile station, and after local routing authorization for the first mobile station is successful, perform local routing authorization for the second mobile station, so as to save network information resources. Alternatively, the local routing executing entity may perform local routing authorization for the first mobile station and the second mobile station concurrently, so as to save the time of local routing authorization.

All or part of the contents in the technical solution provided in the foregoing embodiments may be implemented by software programs, and the software programs are stored in readable storage media such as a computer hard disk, a CD-ROM, or a floppy disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for performing local routing authorization by a local routing (LR) executing entity, comprising:
   initiating a local routing authorization request to a first local routing policy entity and a second local routing policy entity respectively, according to service flow information of a first mobile station or according to service flow information of the first mobile station and a second mobile station so as to enable the first local routing policy entity to perform local routing authorization for the first mobile station and enable the second local routing policy entity to perform local routing authorization for the second mobile station; and
   when a local routing authorization result of the first mobile station and a local routing authorization result of the second mobile station are both success, transmitting, by performing local routing, a service flow corresponding to the service flow information of the first mobile station and a service flow corresponding to the service flow information of the second mobile station,
   wherein the initiating, comprises:
   obtaining the service flow information of the first mobile station;
   initiating, according to the service flow information of the first mobile station, a request for performing the local routing authorization for the first mobile station to the first local routing policy entity that the first mobile station belongs to, so as to enable the first local routing policy entity to perform the local routing authorization for the first mobile station;
   obtaining the service flow information of the second mobile station; and
   initiating, according to the service flow information of the second mobile station and the local routing authorization result of the first mobile station, a request for performing the local routing authorization for the second mobile station to the second local routing policy entity that the second mobile station belongs to, so as to enable the second local routing policy entity to perform the local routing authorization for the second mobile station, and
   wherein the initiating, according to the service flow information of the second mobile station and the local routing authorization result of the first mobile station, a request for performing the local routing authorization for the second mobile station to the second local routing policy entity that the second mobile station belongs to, comprises:
   determining, according to correspondent node information included in the service flow information of the second mobile station, whether the local routing can be executed for the service flow corresponding to the service flow information of the second mobile station;
   if the local routing can be executed for the service flow corresponding to the service flow information of the second mobile station, determining whether the local routing authorization result of the first mobile station is success; and
   if the local routing authorization result of the first mobile station is success, initiating the request for performing the local routing authorization for the second mobile station to the second local routing policy entity that the second mobile station belongs to.

2. The method according to claim 1, wherein the initiating comprises: obtaining the service flow information of the first mobile station; initiating, according to the service flow information of the first mobile station, a request for performing the local routing authorization for the first mobile station to the first local routing policy entity that the first mobile station belongs to, so as to enable the first local routing policy entity to perform the local routing authorization for the first mobile station; and when the local routing authorization result of the first mobile station is success, initiating a request for performing the local routing authorization for the second mobile station to the second local routing policy entity that the second mobile station belongs to, so as to enable the second local routing policy entity to perform the local routing authorization for the second mobile station.

3. The method according to claim 2, further comprising:
   when the local routing authorization result of the second mobile station is success, establishing a data bearer between the LR executing entity and the second mobile station.

4. The method according to claim 2, wherein the initiating, according to the service flow information of the first mobile station, a request for performing the local routing authorization for the first mobile station to the first local routing policy entity that the first mobile station belongs to, comprises:

determining, according to correspondent node information included in the service flow information of the first mobile station, whether local routing can be executed for the service flow corresponding to the service flow information of the first mobile station; and if local routing can be executed for the service flow corresponding to the service flow information of the first mobile station, initiating the request for performing local routing authorization for the first mobile station to the first local routing policy entity that the first mobile station belongs to.

5. The method according to claim 1, wherein the initiating, comprises: obtaining the service flow information of the first mobile station; initiating, according to the service flow information of the first mobile station, a request for performing the local routing authorization for the first mobile station to the first local routing policy entity that the first mobile station belongs to, so as to enable the first local routing policy entity to perform the local routing authorization for the first mobile station; obtaining the service flow information of the second mobile station; and initiating, according to the service flow information of the second mobile station, a request for performing the local routing authorization for the second mobile station to the second local routing policy entity that the second mobile station belongs to, so as to enable the second local routing policy entity to perform the local routing authorization for the second mobile station.

6. The method according to claim 5, wherein the initiating, according to the service flow information of the second mobile station, a request for performing local routing authorization for the second mobile station to the second local routing policy entity that the second mobile station belongs to, comprises:

determining, according to correspondent node information comprised in the service flow information of the second mobile station, whether the local routing can be executed for the service flow corresponding to the service flow information of the second mobile station; and if the local routing can be executed for the service flow corresponding to the service flow information of the second mobile station, initiating the request for performing the local routing authorization for the second mobile station to the second local routing policy entity that the second mobile station belongs to.

7. The method according to claim 1, wherein the initiating, comprises: obtaining the service flow information of the first mobile station; initiating, according to the service flow information of the first mobile station, a request for performing the local routing authorization for the first mobile station to the first local routing policy entity that the first mobile station belongs to, so as to enable the first local routing policy entity to perform the local routing authorization for the first mobile station; obtaining the service flow information of the second mobile station; and initiating, according to the service flow information of the second mobile station and the local routing authorization result of the first mobile station, a request for performing the local routing authorization for the second mobile station to the second local routing policy entity that the second mobile station belongs to, so as to enable the second local routing policy entity to perform the local routing authorization for the second mobile station.

8. The method according to claim 1, wherein after the transmitting, the method further comprises: sending a notification message to the first local routing policy entity and the second local routing policy entity respectively, wherein the notification message indicates that the service flow corresponding to the service flow information of the first mobile station and the service flow corresponding to the service flow information of the second mobile station are transmitted through the local routing.

9. An apparatus for local routing authorization, comprising:

a local routing authorizing module, configured to initiate a local routing authorization request to a first local routing policy entity and a second local routing policy entity respectively, according to service flow information of a first mobile station or according to service flow information of the first mobile station and a second mobile station, so as to enable the first local routing policy entity to perform local routing authorization for the first mobile station and enable the second local routing policy entity to perform local routing authorization for the second mobile station; and a local routing transmitting module, configured to transmit, by performing local routing, a service flow corresponding to the service flow information of the first mobile station and a service flow corresponding to the service flow information of the second mobile station, when a local routing authorization result of the first mobile station and a local routing authorization result of the second mobile station are both success, wherein the local routing authorizing module comprises:

a first service flow information obtaining unit, configured to obtain the service flow information of the first mobile station;

a first local routing authorizing unit, configured to initiate, according to the service flow information of the first mobile station obtained by the first service flow information obtaining unit, a request for performing the local routing authorization for the first mobile station to the first local routing policy entity that the first mobile station belongs to, so as to enable the first local routing policy entity to perform the local routing authorization for the first mobile station;

a second service flow information obtaining unit, configured to obtain the service flow information of the second mobile station; and a fourth local routing authorizing unit, configured to initiate, according to the local routing authorization result of the first mobile station and the service flow information of the second mobile station obtained by the second service flow information obtaining unit, a request for performing the local routing authorization for the second mobile station to the second local routing policy entity that the second mobile station belongs to, so as to enable the second local routing policy entity to perform the local routing authorization for the second mobile station, and wherein the fourth local routing authorizing unit comprises:

a third determining subunit, configured to determine, according to correspondent node information included in the service flow information of the second mobile station obtained by the second service flow information obtaining unit, whether the local routing can be executed for the service flow corresponding to the service flow information of the second mobile station;

a fourth determining subunit, configured to determine, when the third determining subunit determines that the local routing can be executed for the service flow corresponding to the service flow information of the second mobile station, whether the local routing authorization result of the first mobile station is success; and a third local routing authorizing subunit, configured to initiate, when the fourth determining subunit determines that the local routing authorization result of the first mobile station is success, the request for performing the local routing authorization for the second mobile station to the second local routing policy entity that the second mobile station belongs to, so as to enable the second local routing policy entity to perform the local routing authorization for the second mobile station.

10. The apparatus according to claim 9, wherein the local routing authorizing module comprises: a first service flow information obtaining unit, configured to obtain the service flow information of the first mobile station; a first local routing authorizing unit, configured to initiate, according to the service flow information of the first mobile station obtained by the first service flow information obtaining unit, a request for performing the local routing authorization for the first mobile station to the first local routing policy entity that the first mobile station belongs to, so as to enable the first local routing policy entity to perform the local routing authorization for the first mobile station; and a second local routing authorizing unit, configured to initiate, when the local routing authorization result of the first mobile station is success, a request for performing the local routing authorization for the second mobile station to the second local routing policy entity that the second mobile station belongs to, so as to enable the second local routing policy entity to perform the local routing authorization for the second mobile station.

11. The apparatus according to claim 10, wherein the local routing authorizing module further comprises:

a data bearer establishing unit, configured to establish a data bearer between the apparatus and the second mobile station when the local routing authorization result of the second mobile station is success.

12. The apparatus according to claim 10, wherein the first local routing authorizing unit comprises:

a first determining subunit, configured to determine, according to correspondent node information included in the service flow information of the first mobile station obtained by the first service flow information obtaining unit, whether the local routing can be executed for the service flow corresponding to the service flow information of the first mobile station; and a first local routing authorizing subunit, configured to initiate, when the first determining subunit determines that the local routing can be executed for the service flow corresponding to the service flow information of the first mobile station, the request for performing the local routing authorization for the first mobile station to the first local routing policy entity that the first mobile station belongs to, so as to enable the first local routing policy entity to perform the local routing authorization for the first mobile station.

13. The apparatus according to claim 9, wherein the local routing authorizing module comprises: a first service flow information obtaining unit, configured to obtain the service flow information of the first mobile station; a first local routing authorizing unit, configured to initiate, according to the service flow information of the first mobile station obtained by the first service flow information obtaining unit, a request for performing the local routing authorization for the first mobile station to the first local routing policy entity that the first mobile station belongs to, so as to enable the first local routing policy entity to perform the local routing authorization for the first mobile station; a second service flow information obtaining unit, configured to obtain the service flow information of the second mobile station; and a third local routing authorizing unit, configured to initiate, according to the service flow information of the second mobile station obtained by the second service flow information obtaining unit, a request for performing the local routing authorization for the second mobile station to the second local routing policy entity that the second mobile station belongs to, so as to enable the second local routing policy entity to perform the local routing authorization for the second mobile station.

14. The apparatus according to claim 13, wherein the third local routing authorizing unit comprises:

a second determining subunit, configured to determine, according to correspondent node information included in the service flow information of the second mobile station obtained by the second service flow information obtaining unit, whether the local routing can be executed for the service flow corresponding to the service flow information of the second mobile station; and a second local routing authorizing subunit, configured to initiate, when the second determining subunit determines that the local routing can be executed for the service flow corresponding to the service flow information of the second mobile station, the request for performing the local routing authorization for the second mobile station to the second local routing policy entity that the second mobile station belongs to, so as to enable the second local routing policy entity to perform the local routing authorization for the second mobile station.

15. The apparatus according to claim 9, wherein the local routing authorizing module comprises: a first service flow information obtaining unit, configured to obtain the service flow information of the first mobile station; a first local routing authorizing unit, configured to initiate, according to the service flow information of the first mobile station obtained by the first service flow information obtaining unit, a request for performing the local routing authorization for the first mobile station to the first local routing policy entity that the first mobile station belongs to, so as to enable the first local routing policy entity to perform the local routing authorization for the first mobile station; a second service flow information obtaining unit, configured to obtain the service flow information of the second mobile station; and a fourth local routing authorizing unit, configured to initiate, according to the local routing authorization result of the first mobile station and the service flow information of the second mobile station obtained by the second service flow information obtaining unit, a request for performing the local routing authorization for the second mobile station to the second local routing policy entity that the second mobile station belongs to, so as to enable the second local routing policy entity to perform the local routing authorization for the second mobile station.

16. The apparatus according to claim 9, further comprising: a notifying module, configured to send, after the local routing transmitting module transmits the service flow corresponding to the service flow information of the first mobile station and the service flow corresponding to the service flow information of the second mobile station through the local routing, a notification message to the first local routing policy entity and the second local routing policy entity respectively, wherein the notification message indicates that the service flow corresponding to the service flow information of the first mobile station and the service flow corresponding to the service flow information of the second mobile station are transmitted through the local routing.

17. A system for local routing authorization, comprising:
a local routing executing entity, a first local routing policy entity, and a second local routing policy entity, wherein:
the local routing executing entity is configured to initiate a local routing authorization request to the first local routing policy entity and the second local routing policy entity respectively, according to service flow information of a first mobile station or according to service flow information of the first mobile station and a second mobile station; and when a local routing authorization result of the first mobile station and a local routing authorization result of the second mobile station are both success, transmit, by performing local routing, a service flow corresponding to the service flow information of the first mobile station and a service flow corresponding to the service flow information of the second mobile station;
the first local routing policy entity is configured to perform a local routing authorization for the first mobile station after receiving the local routing authorization request initiated by the local routing executing entity; and
the second local routing policy entity is configured to perform local routing authorization for the second mobile station after receiving the local routing authorization request initiated by the local routing executing entity, and wherein:
the local routing executing entity is configured to obtain the service flow information of the first mobile station, and initiate, according to the service flow information of the first mobile station, a request for performing the local routing authorization for the first mobile station to the first local routing policy entity; after the first local routing policy entity successfully performs the local routing authorization for the first mobile station, initiate a request for performing the local routing authorization for the second mobile station to the second local routing policy entity; and when the local routing authorization result of the first mobile station and the local routing authorization result of the second mobile station are both success, transmit, through the local routing, the service flow corresponding to the service flow information of the first mobile station and the service flow corresponding to the service flow information of the second mobile station;
the first local routing policy entity is configured to: after receiving the request for performing the local routing authorization for the first mobile station from the local routing executing entity, determine, according to subscription information of the first mobile station and/or a policy of an operator that the first mobile station belongs to, whether to allow to execute the local routing on the service flow corresponding to the service flow information of the first mobile station; and after determining to allow to execute the local routing on the service flow corresponding to the service flow information of the first mobile station, perform the local routing authorization for the first mobile station; and
the second local routing policy entity is configured to: after receiving the request for performing the local routing authorization for the second mobile station from the local routing executing entity, determine, according to subscription information of the second mobile station and/or a policy of an operator that the second mobile station belongs to, whether to allow to execute the local routing on the service flow corresponding to the service flow information of the second mobile station; and after determining to allow to execute the local routing on the service flow corresponding to the service flow information of the second mobile station, perform the local routing authorization for the second mobile station.

18. A system for local routing authorization, comprising: a local routing executing entity, a first local routing policy entity, and a second local routing policy entity, wherein:
the local routing executing entity is configured to initiate a local routing authorization request to the first local routing policy entity and the second local routing policy entity respectively, according to service flow information of a first mobile station or according to service flow information of the first mobile station and a second mobile station; and when a local routing authorization result of the first mobile station and a local routing authorization result of the second mobile station are both success, transmit, by performing local routing, a service flow corresponding to the service flow information of the first mobile station and a service flow corresponding to the service flow information of the second mobile station;
the first local routing policy entity is configured to perform a local routing authorization for the first mobile station after receiving the local routing authorization request initiated by the local routing executing entity; and
the second local routing policy entity is configured to perform local routing authorization for the second mobile station after receiving the local routing authorization request initiated by the local routing executing entity, wherein:
the local routing executing entity is specifically configured to obtain the service flow information of the first mobile station, and initiate, according to the service flow information of the first mobile station, a request for performing the local routing authorization for the first mobile station to the first local routing policy entity; obtain the service flow information of the second mobile station, and initiate, according to the service flow information of the second mobile station, a request for performing the local routing authorization for the second mobile station to the second local routing policy entity; and when the local routing authorization result of the first mobile station and the local routing authorization result of the second mobile station are both success, transmit, through the local routing, the service flow corresponding to the service flow information of the first mobile station and the service flow corresponding to the service flow information of the second mobile station;
the first local routing policy entity is configured to: after receiving the request for performing the local routing authorization for the first mobile station from the local routing executing entity, determine, according to subscription information of the first mobile station and/or a policy of an operator that the first mobile station belongs to, whether to allow to execute the local routing on the service flow corresponding to the service flow information of the first mobile station; and after determining to allow to execute the local routing on the service flow corresponding to the service flow information of the first mobile station, perform the local routing authorization for the first mobile station; and
the second local routing policy entity is configured to: after receiving the request for performing the local routing authorization for the second mobile station from the local routing executing entity, determine, according to subscription information of the second mobile station and/or a policy of an operator that the second mobile station belongs to, whether to allow to execute the local routing on the service flow corresponding to the service flow information of the second mobile station; and after determining to allow to execute the local routing on the service flow corresponding to the service flow information of the second mobile station, perform the local routing authorization for the second mobile station.

19. A system for local routing authorization, comprising: a local routing executing entity, a first local routing policy entity, and a second local routing policy entity, wherein: the local routing executing entity is configured to initiate a local routing authorization request to the first local routing policy entity and the second local routing policy entity respectively, according to service flow information of a first mobile station or according to service flow information of the first mobile station and a second mobile station; and when a local routing authorization result of the first mobile station and a local routing authorization result of the second mobile station are both success, transmit, by performing local routing, a service flow corresponding to the service flow information of the first mobile station and a service flow corresponding to the service flow information of the second mobile station; the first local routing policy entity is configured to perform a local routing authorization for the first mobile station after receiving the local routing authorization request initiated by the local routing executing entity; and the second local routing policy entity is configured to perform local routing authorization for the second mobile station after receiving the local routing authorization request initiated by the local routing executing entity, wherein: the local routing executing entity is configured to obtain the service flow information of the first mobile station, and initiate, according to the service flow information of the first mobile station, a request for performing the local routing authorization for the first mobile station to the first local routing policy entity; and obtain the service flow information of the second mobile station, and according to the service flow information of the second mobile station and the local routing authorization result of the first mobile station, initiate a request for performing the local routing authorization for the second mobile station to the second local routing policy entity; the first local routing policy entity is configured to: after receiving the request for performing the local routing authorization for the first mobile station from the local routing executing entity, determine, according to subscription information of the first mobile station and/or a policy of an operator that the first mobile station belongs to, whether to allow to execute the local routing on the service flow corresponding to the service flow information of the first mobile station; and after determining to allow to execute the local routing on the service flow corresponding to the service flow information of the first mobile station, perform the local routing authorization for the first mobile station; and the second local routing policy entity is configured to: after receiving the request for performing the local routing authorization for the second mobile station from the local routing executing entity, determine, according to subscription information of the second mobile station and/or a policy of an operator that the second mobile station belongs to, whether to allow to execute the local routing on the service flow corresponding to the service flow information of the second mobile station; and after determining to allow to execute the local routing on the service flow corresponding to the service flow information of the second mobile station, perform the local routing authorization for the second mobile station.

* * * * *